(12) United States Patent
Tawa

(10) Patent No.: US 11,595,086 B2
(45) Date of Patent: Feb. 28, 2023

(54) CALIBRATION CIRCUIT, REMOTE UNIT APPARATUS, AND RADIO BASE STATION SYSTEM

(71) Applicant: NEC Corporation, Tokyo (JP)

(72) Inventor: Noriaki Tawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/374,657

(22) Filed: Jul. 13, 2021

(65) Prior Publication Data
US 2022/0021417 A1 Jan. 20, 2022

(30) Foreign Application Priority Data

Jul. 17, 2020 (JP) .............................. JP2020-122667

(51) Int. Cl.
| | | |
|---|---|---|
| *H04L 5/14* | (2006.01) | |
| *H04B 7/024* | (2017.01) | |
| *H04B 17/11* | (2015.01) | |
| *H04B 1/04* | (2006.01) | |
| *H04W 72/04* | (2023.01) | |

(52) U.S. Cl.
CPC .............. *H04B 7/024* (2013.01); *H04B 1/04* (2013.01); *H04B 17/11* (2015.01); *H04W 72/042* (2013.01); *H04L 5/14* (2013.01)

(58) Field of Classification Search
CPC ......... H04L 5/14; H04L 5/0023; H04L 27/38; H04L 41/12; H04L 1/00; H04L 1/0001; H04L 25/03019; H04L 27/18; H04L 25/02; H04W 16/28; H04W 76/10; H04W 16/26; H04W 4/00; H04W 40/20; H04W 84/06; H04W 72/0453; H04W 52/245; H04W 52/46; H04J 11/0079; H04J 11/0056; H04J 11/0059; H04J 11/0073; H04J 11/0076; H04J 11/0069; H04J 14/0298; H04J 14/06
USPC ........................................................ 375/262
See application file for complete search history.

(56) References Cited

U.S. PATENT DOCUMENTS

| | | | |
|---|---|---|---|
| 10,128,894 B1* | 11/2018 | O'Brien ................. | H04B 17/12 |
| 2016/0036125 A1* | 2/2016 | Gupta ..................... | H01Q 3/34 |
| | | | 342/369 |
| 2016/0359507 A1* | 12/2016 | Gerdin ................. | H04B 1/0475 |

FOREIGN PATENT DOCUMENTS

JP 2018-207403 A 12/2018

\* cited by examiner

*Primary Examiner* — Eva Y Puente

(57) ABSTRACT

A calibration circuit 2 according to the present disclosure is a calibration circuit 2 in a radio base station system 1 including a remote unit part 10 and a plurality of distributed antenna parts 20 connected to the remote unit part 10 through a plurality of respective cables, the calibration circuit 2 including: a detection unit 2a configured to detect a plurality of local oscillation signals that are output from a local oscillator 13 of the remote unit part 10 and are respectively reflected from the plurality of distributed antenna parts 20 through the plurality of cables; and a phase adjustment unit 2b configured to adjust a phase of each of the plurality of local oscillation signals output through the plurality of respective cables from the remote unit part 10 based on a result of the detection.

20 Claims, 10 Drawing Sheets

CALIBRATION CIRCUIT, REMOTE UNIT APPARATUS, AND RADIO BASE STATION SYSTEM

INCORPORATION BY REFERENCE

This application is based upon and claims the benefit of priority from Japanese patent application No. 2020-122667, filed on Jul. 17, 2020, the disclosure of which is incorporated herein in its entirety by reference.

TECHNICAL FIELD

The present disclosure relates to a calibration circuit, a remote unit apparatus, and a radio base station system.

BACKGROUND ART

In recent years, regarding Multiple Input Multiple Output (MIMO) technology which has been practically used in mobile communications and wireless LAN services, efforts are being made to apply Distributed MIMO (D-MIMO) technology to operate a system configured by a plurality of distributed antenna parts of a base station for the purpose of further increasing the communication capacity and stabilize the communication thereof.

In a typical MIMO (C-MIMO: Co-located-MIMO) technology, a distance between a Remote Unit (RU) part that converts a digital signal into an analog signal and an antenna part that transmits and receives a Down Link (DL)/Up Link (UL) signal is short, and thus these parts are stored in one housing. In contrast, D-MIMO is a system in which a plurality of antenna parts are disposed in a distributed manner. Accordingly, a delay or a phase difference occurs in a transmission/reception signal of each Distributed Antenna (DA) part, because a plurality of coaxial cables connecting the RU part to the DA parts, respectively, have different lengths. Therefore, each DA part is individually calibrated for transmission and reception characteristics using an external measuring instrument. Japanese Unexamined Patent Application Publication No. 2018-207403 discloses a technique related to a calibration circuit of a communication apparatus.

As described above, in the D-MIMO, the positions where the DA parts are disposed are distributed, and it is thus required to perform a calibration using an external measuring instrument after the apparatus is installed. Therefore, each DA part is individually calibrated for transmission and reception characteristics using an external measuring instrument. Japanese Unexamined Patent Application Publication No. 2018-207403 discloses a technique related to a calibration circuit that corrects a delay and a phase. However, the technique disclosed in Japanese Unexamined Patent Application Publication No. 2018-207403 has a problem that a calibration has to be performed using an external measuring instrument for each apparatus after the DA parts are disposed.

The present disclosure has been made to solve the above-described problem and an object thereof is to provide a calibration circuit capable of performing, in an apparatus in which a plurality of antenna parts can be disposed in a distributed manner in a radio communication system, calibrations of phases of the plurality of antenna parts without using an external measuring instrument.

SUMMARY

A calibration circuit according to the present disclosure is a calibration circuit in a radio base station system, the radio base station system including a remote unit part and a plurality of distributed antenna parts connected to the remote unit part through a plurality of respective cables, the calibration circuit including: a detection unit configured to detect a plurality of local oscillation signals, the plurality of local oscillation signals being output from a local oscillator of the remote unit part and being respectively reflected from the plurality of distributed antenna parts through the plurality of cables; and a phase adjustment unit configured to adjust a phase of each of the plurality of local oscillation signals that are output through the plurality of respective cables from the remote unit part based on a result of the detection.

A remote unit apparatus according to the present disclosure is a remote unit apparatus connected to a plurality of distributed antenna apparatuses through a plurality of respective cables in a radio base station system, the remote unit apparatus including: a local oscillator configured to generate a local oscillation signal; a plurality of variable phase shifters each configured to output the local oscillation signal to a corresponding one of the plurality of cables; and a calibration circuit configured to control the plurality of variable phase shifters, the calibration circuit including: a detection unit configured to detect a plurality of the local oscillation signals respectively reflected from the plurality of distributed antenna apparatuses through the plurality of cables; and a phase adjustment unit configured to adjust an amount of phase change of each of the plurality of variable phase shifters based on a result of the detection.

A radio base station system according to the present disclosure is a radio base station system including a remote unit part and a plurality of distributed antenna parts connected to the remote unit part through a plurality of respective cables, the remote unit part including: a local oscillator configured to generate a local oscillation signal; a plurality of variable phase shifters each configured to output the local oscillation signal to a corresponding one of the plurality of cables; and a calibration circuit configured to control the plurality of variable phase shifters, the calibration circuit including: a detection unit configured to detect a plurality of the local oscillation signals respectively reflected from the plurality of distributed antenna parts through the plurality of cables; and a phase adjustment unit configured to adjust an amount of phase change of each of the plurality of variable phase shifters based on a result of the detection.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Figure 1:
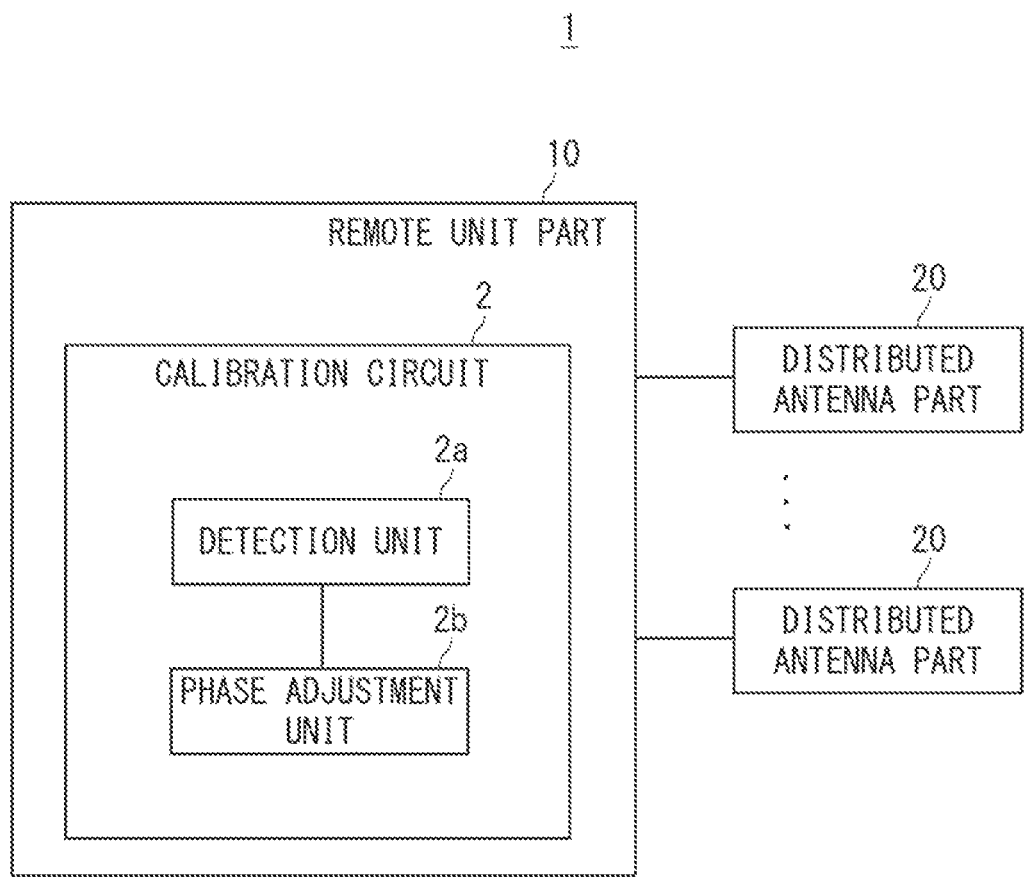
FIG. 1 is a configuration diagram of a radio base station system according to a first example embodiment of the present disclosure.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference numerals (or symbols), and redundant descriptions thereof will be omitted.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed example, or a supplementary example of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following example embodiments, their components (including operation steps and the like) are not necessarily indispensable except for cases where the component is explicitly specified or the component is obviously indispensable based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

First Example Embodiment

FIG. 1 shows a configuration of a radio base station system 1 in this example embodiment. The radio base station system 1 according to this example embodiment includes a remote unit part (hereinafter referred to as an "RU part 10") and a plurality of distributed antenna parts (hereinafter referred to as "DA parts") connected to the RU part 10 through a plurality of cables 19.

The RU part 10 includes a calibration circuit 2. Further, the RU part 10 transmits and receives a downlink (hereinafter referred to as "DL") signal and an uplink (hereinafter referred to as "UL") signal.

The calibration circuit 2 includes a detection unit 2a and a phase adjustment unit 2b. The detection unit 2a detects a plurality of local oscillation signals that are output from a local oscillator of the remote unit part and are respectively reflected from the plurality of distributed antenna parts through the plurality of cables. The phase adjustment unit 2b adjusts a phase of each of the plurality of local oscillation signals output from the RU part 10 through the plurality of respective cables 19 based on a result of the detection performed by the detection unit 2a.

Second Example Embodiment

Figure 2:
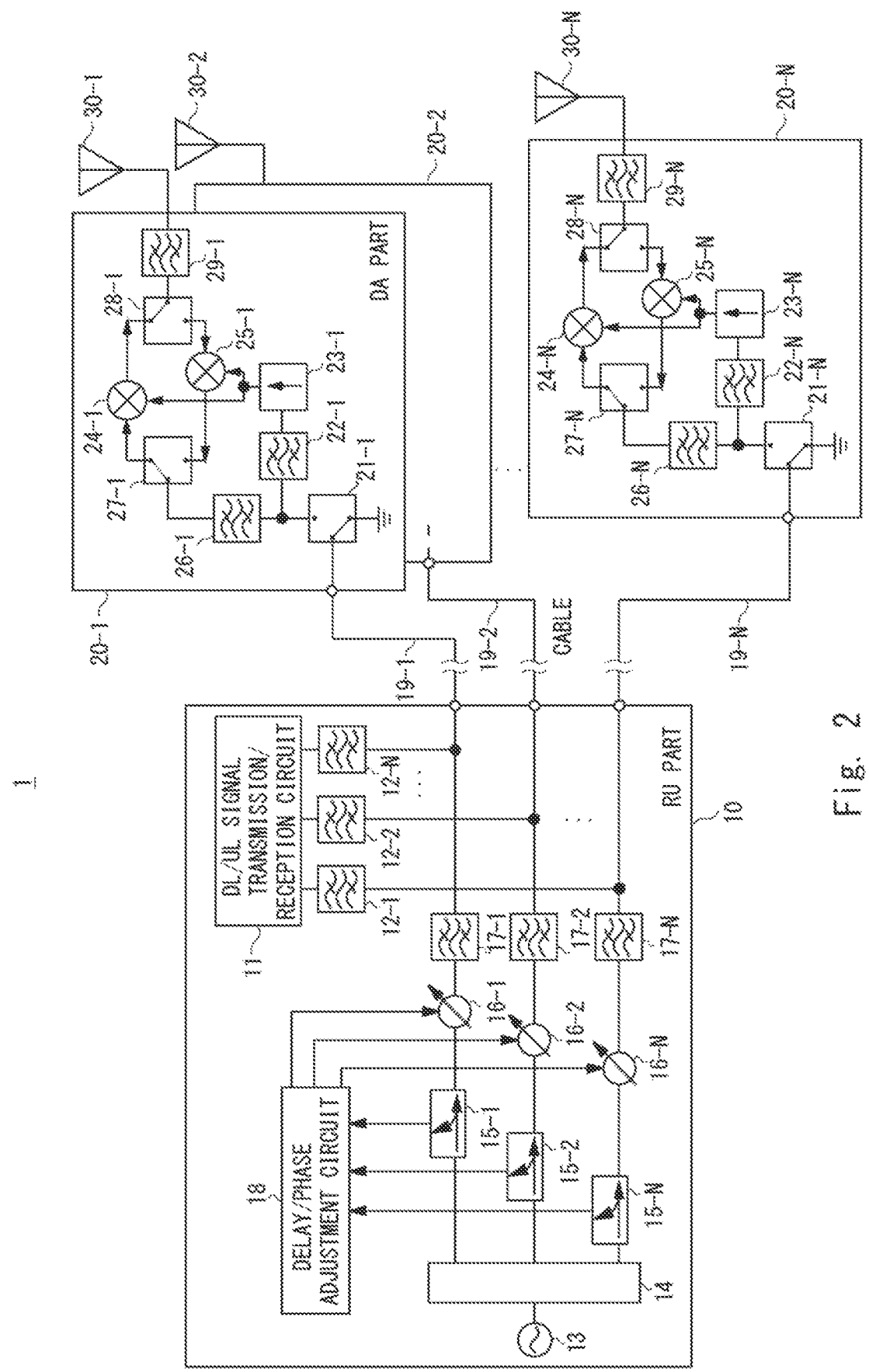
FIG. 2 is a configuration diagram of a radio base station system according to a second example embodiment of the present disclosure.

FIG. 2 shows a configuration example of a radio base station system according to a second example embodiment. The radio base station system according to this example embodiment includes the RU part 10 and a plurality of DA parts 20-1 to 20-N of a D-MIMO apparatus. In this example embodiment, it is assumed that the radio base station system 1 includes N of the DA parts 20 (n is an integer equal to or greater than 2). The radio base station system 1 according to this example embodiment uses, for example, a TDD (Time Division Duplex) system or a TDMA (Time Division Multiple Access) system. However, systems used by the radio base station system 1 are not limited thereto, and the radio base station system 1 can instead use various types of multiple access systems. Hereinafter, the radio base station system 1 described in this example embodiment uses the TDD system.

The RU part 10 performs an analog-to-digital conversion on information to be transmitted and received and then transmits and receives the analog-to-digital converted information, and adjusts phases and delays between UL signals received by the DA parts 20-1 to 20-N. Further, the DA parts 20 are disposed in a distributed manner, and up-conversion of a DL signal and down-conversion of a UL signal are performed.

The RU part 10 includes a DL/UL signal transmission/reception circuit 11, first bandpass filters 12-1 to 12-N, a local oscillator 13, a divider 14, couplers 15-1 to 15-N, variable phase shifters 16-1 to 16-N, second bandpass filters 17-1 to 17-N, and a calibration circuit. In this example embodiment and third and fourth example embodiments, the calibration circuit will be described as being a delay/phase adjustment circuit 18. Further, the RU part 10 is connected to the DA parts 20 through the respective cables 19-1 to 19-N. The cables 19 transmit DL signals, UL signals, and LO signals of an intermediate frequency band. As the cables 19, various type of communication cables, such as coaxial cables, are used. The cables 19 may have different lengths. Note that, in the following description, the DA parts 20-1 to 20-N, the first bandpass filters 12-1 to 12-N, the couplers 15-1 to 15-N, the variable phase shifters 16-1 to 16-N, the second bandpass filters 17-1 to 17-N, and the cables 19-1 to 19-N, respectively, are simply referred to as the DA part 20, the first bandpass filter 12, the coupler 15, the variable phase shifter 16, the second bandpass filter 17, and the cable 19 unless it is particularly necessary to distinguish them from each other.

The DL/UL signal transmission/reception circuit 11 has an analog-to-digital conversion function. Further, the DL/UL signal transmission/reception circuit 11 generates a DL signal (hereinafter referred to as a "DL IF signal") of the intermediate frequency band and receives a UL signal (hereinafter referred to as a "UL IF signal") of the intermediate frequency band.

The first bandpass filter 12 transmits only an intermediate frequency band signal of the DL IF signals generated in the DL/UL signal transmission/reception circuit 11. Further, the first bandpass filter 12 preferably prevents a local oscillation signal (hereinafter referred to as an "LO IF signal") of the intermediate frequency band oscillated by the local oscillator 13 from entering the DL/UL signal transmission/reception circuit 11.

The local oscillator 13 generates an LO IF signal. The generated LO IF signal is used in each DA part 20 in order to up-convert the DL IF signal to a carrier frequency band signal. Further, the LO IF signal is used in order to down-convert the received UL signal to an intermediate frequency band signal. Further, the LO IF signal is used by multiplying it in each DA part 20 and thereby increasing its frequency.

The divider 14 distributes the LO IF signal generated by the local oscillator 13. The distributed LO IF signal passes through the coupler (directional coupler) 15. Since the LO IF signal is transmitted from the local oscillator 13 to each DA part 20, it is preferable that the LO IF signal is not transmitted to the delay/phase adjustment circuit 18. As the coupler 15, a circulator may be used instead of a coupler.

The variable phase shifter 16 changes a phase of the LO IF signal. In this example embodiment, the range of the phase amount which the variable phase shifter 16 changes is set to a range of 0 to 2 π. The variable phase shifter 16 corrects differences between the respective lengths of the cables 19 connecting the RU part 10 to the DA parts 20, respectively, and adjusts the phase amounts of the LO IF signals which the variable phase shifter 16 changes so that the phases of the LO IF signals coincide with each other in the respective DA parts 20.

The second bandpass filter 17 removes an out-of-band signal of the LO IF signals of which the phases have been adjusted by the variable phase shifter 16. The second bandpass filter 17 preferably prevents the DL IF signal and the UL IF signal sent from the DA part 20 from entering the local oscillator 13.

The delay/phase adjustment circuit 18 analyzes a reflected wave of the LO IF signal and adjusts the delay amount or the phase amount of the LO IF signal. The delay/phase adjustment circuit 18 will be described in detail later.

Each DA part 20 includes first switches 21-1 to 21-N, third bandpass filters 22-1 to 22-N, frequency multipliers 23-1 to 23-N, first mixers 24-1 to 24-N, second mixers 25-1 to 25-N, fourth bandpass filters 26-1 to 26-N, second switches 27-1 to 27-N, third switches 28-1 to 28-N, fifth bandpass filters 29-1 to 29-N, and antennas 30-1 to 30-N. Each DA part 20 has the same configuration. Note that, in the following description, the first switches 21-1 to 21-N, the third bandpass filters 22-1 to 22-N, the frequency multipliers 23-1 to 23-N, the first mixers 24-1 to 24-N, the second mixers 25-1 to 25-N, the fourth bandpass filters 26-1 to 26-N, the second switches 27-1 to 27-N, the third switches 28-1 to 28-N, the fifth bandpass filters 29-1 to 29-N, and the antennas 30-1 to 30-N, respectively, are simply referred to as the first switch 21, the third bandpass filter 22, the frequency multiplier 23, the first mixer 24, the second mixer 25, the fourth bandpass filter 26, the second switch 27, the third switch 28, the fifth bandpass filter 29, and the antenna 30 unless it is particularly necessary to distinguish them from each other.

In each DA part 20, a frequency conversion (up-conversion and down-conversion) of the DL/UL signal is performed using the LO signal transmitted by the cable 19. In this example embodiment, the DA parts 20 are disposed in a distributed manner at any place. Therefore, the lengths of the cables 19 connecting the RU part 10 to the DA parts 20, respectively, are different from each other. Each DA part 20 transmits the DL signal sent from the RU part 10 to a User Equipment (UE), receives a signal from the UE, and transmits the received signal to the RU part 10.

The first switch 21 is set so that a signal of a path on the third bandpass filter 22 side is transmitted in a normal operation. In a normal operation means a state in which the RU part 10 and each DA part 20 can communicate with the UE.

The third bandpass filter 22 removes an out-of-band signal of the LO IF signals. The LO IF signal that has passed through the third bandpass filter 22 is multiplied by the frequency multiplier 23 and transmitted to the first mixer 24 or the second mixer 25. In the following description, the multiplied LO IF signal is referred to as an LO signal.

The fourth bandpass filter 26 makes signals of the band of the DL IF signal and the UL IF signal pass through it. Since the DL IF signal transmitted to the DA part 20 cannot pass through the third bandpass filter 22, it cannot pass through the frequency multiplier 23. Therefore, the DL IF signal passes through the fourth bandpass filter 26 and is transmitted to the second switch 27.

On the other hand, the LO IF signal cannot pass through the fourth bandpass filter 26. Therefore, the LO IF signal passes through the third bandpass filter 22 and is transmitted to the frequency multiplier 23.

The second and the third switches 27 and 28 are set so that they make the DL IF signal pass through a path on the first mixer 24 side during a DL period and make the UL IF signal pass through a path on the second mixer 25 side during a UL period. The DL IF signal input to the first mixer 24 is multiplied by the LO signal also input to the first mixer 24, and thus the DL IF signal is up-converted to a carrier frequency band signal. The DL IF signal up-converted to a carrier frequency band signal is referred to as the DL signal. Further, the UL signal, which is a carrier frequency band signal of the UL IF signals received by the DA part 20, is multiplied by the LO signal input to the second mixer 25, and is down-converted to an intermediate frequency band signal.

The fifth bandpass filter 29 removes an out-of-band signal of the DL signals. The DL signals from which the out-of-band signal is removed are transmitted to a radio terminal through the antenna 30. Further, the fifth bandpass filter 29 removes the out-of-band signal of the UL signals from the UL signals received by the antenna 30.

The UL IF signal received and down-converted is transmitted in a direction the reverse of that of the DL IF signal and input to the DL/UL signal transmission/reception circuit 11 of the RU part 10. The UL IF signal input to the DL/UL signal transmission/reception circuit 11 is down-converted to a baseband signal and demodulated.

Figure 3:
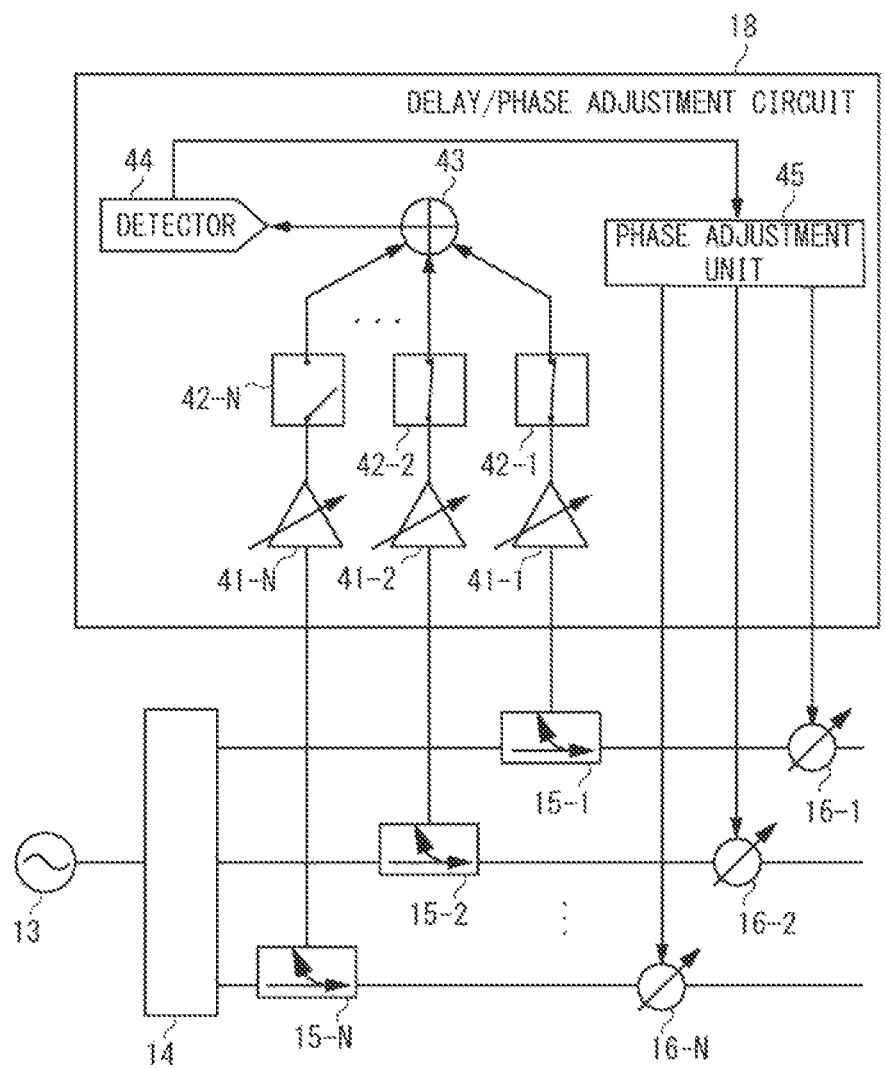
FIG. 3 is a diagram of a peripheral configuration of a calibration circuit according to the second example embodiment of the present disclosure.

The delay/phase adjustment circuit 18 of the RU part 10 will be described below with reference to FIG. 3. FIG. 3 is a configuration diagram of the delay/phase adjustment circuit 18 according to this example embodiment. The delay/phase adjustment circuit 18 analyzes a reflected wave of the LO IF signal and adjusts the delay amount or the phase amount of the LO IF signal. The delay/phase adjustment circuit 18 includes variable attenuators 41-1 to 41-N, fourth switches 42-1 to 42-N, an adder 43, a detector 44, and a phase adjustment unit 45. Note that, in the following description, the variable attenuators 41-1 to 41-N and the fourth switches 42-1 to 42-N, respectively, are simply referred to as the variable attenuator 41 and the fourth switch 42 unless it is particularly necessary to distinguish them from each other.

The variable attenuator 41 adjusts power of the returned LO IF signal. The LO IF signal selected by the fourth switch 42 is input to the adder 43. The power of the input LO IF signal is measured by the detector 44. The amount of attenuation of the variable attenuator 41 is adjusted so that the power of the LO IF signal input to the adder 43 in one system becomes equal to the power of the LO IF signal input to the adder 43 in other systems.

One of the systems is used as a reference for the setting of the variable phase shifter 16. An example in which a 1-system is used as a reference for the setting of the variable phase shifter 16 will be described below. First, the fourth switch 42-1 is turned on, and then one of other fourth switches 42-2 to 42-N is turned on. At this time, two LO IF signals are input and added to the adder 43. The detector 44 measures the signal level of the added LO IF signal and adjusts the phase amount of the signal which the variable phase shifter 16 changes so that the signal level is minimized. This is because if the phase difference between the signals is small, the signal levels of the added signals are minimized.

<Description of a Flow of a Signal Using a Calculation Formula in the Second Example Embodiment>

Figure 4:
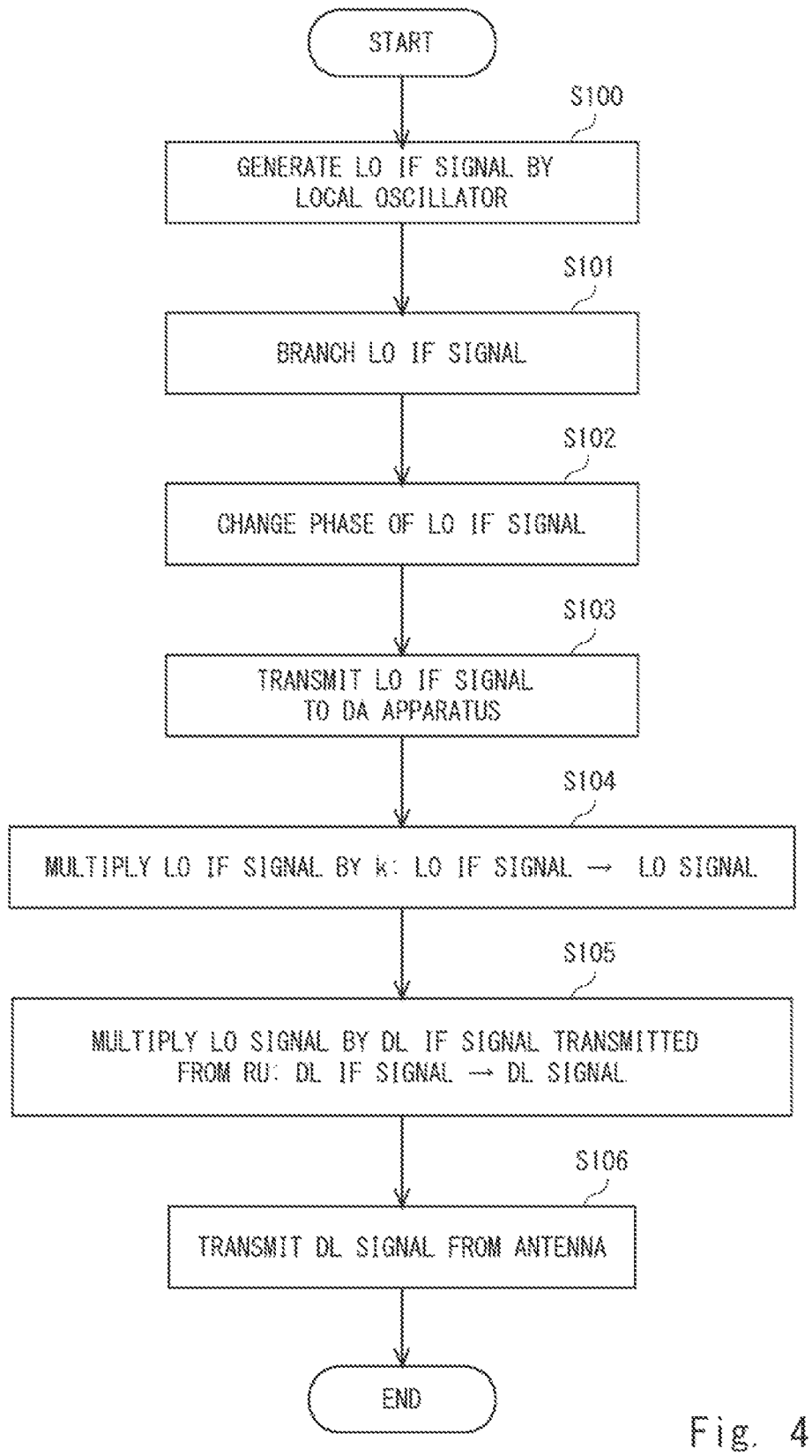
FIG. 4 is a flowchart of a DL signal according to the second example embodiment of the present disclosure.

First, transmission of a DL signal will be described with reference to FIG. 4. FIG. 4 is a flowchart showing a flow of the DL signal. The DL IF signal $D_{IFn}(t)$ which has been generated by the DL/UL signal transmission/reception circuit 11 and is sent to the DA part 20-n of an n-system is expressed by Expression (1). Note that $D_{BBn}(t)$ is a baseband signal of the DL signal of the n-system, and $\omega_{IF}$ is an angular frequency of the DL IF signal. In Expression 1, j is an imaginary number and t is a time.

[Expression 1]

$$D_{IFn}(t) = D_{BBn}(t)\exp(j\omega_{IF}t) \quad (1)$$

An LO signal (LO IF) of the intermediate frequency is generated by the local oscillator 13 (Step 100). The LO IF signal is used in each DA part 20 in order to up-convert the DL IF signal to a carrier frequency band signal and in order to down-convert the received UL signal to an intermediate frequency band signal. The LO IF signal is used by multiplying it in each DA part 20 and thereby increasing its frequency. This multiplication number is defined as k, and in the second example embodiment, k is an even number.

The LO IF signal generated by the local oscillator 13 is divided into N signals by the divider 14 (Step 101). The divided LO IF signal $L_{IFn}(t)$ of the n-system is expressed as follows.

[Expression 2]

$$L_{IFn}(t) = \exp\left(j\frac{\omega_{LO}}{k}t\right) \quad (2)$$

In this description, the attenuation of the LO IF signal is omitted for the sake of simplicity, and the amplitude thereof is always set to 1. Here, $\omega_{LO}$ is an angular frequency of the LO IF signal multiplied by k. Further, $\omega_{LO}$ satisfies the following relation. Note that $\omega_{RF}$ is an angular frequency of the carrier frequency.

[Expression 3]

$$\omega_{RF} = \omega_{LO} + \omega_{IF} \quad (3)$$

The variable phase shifter 16 changes a phase of the LO IF signal (Step 102). The range of a phase amount $\varphi_n$ that is adjustable by the variable phase shifter 16 is set to a range of 0 to $2\pi$. The variable phase shifter 16 corrects differences in the lengths of the cables 19 connecting the RU part 10 to the DA parts 20, respectively, and adjusts the phases of the LO IF signals so that they coincide with each other in the respective DA parts 20. The phase amount $\varphi_n$ is determined by a method described later.

The LO IF signal $L_{IFn}(t)$ of the n-system output from the RU part 10 is transmitted to the DA part 20-n through the cable 19-n (Step 103). An LO IF signal $L'_{IFn}(t)$ in the DA part 20-n can be expressed as follows. Note that $\theta_n$ is an amount of phase delay due to transmission of the cable 19-n.

[Expression 4]

$$L'_{IFn}(t) = \exp\left\{j\left(\frac{\omega_{LO}}{k}t + \varphi_n + \theta_n\right)\right\}. \quad (4)$$

The LO IF signal that has passed through the third bandpass filter 22-n is multiplied by k by the frequency multiplier 23-n (Step 104). The multiplied LO IF signal is referred to as an LO signal. The LO signal $L_{RFn}(t)$ of the n-system can be expressed as follows.

[Expression 5]

$$L_{RFn}(t) = \exp\{j(\omega_{LO}t + k\varphi_n + k\theta_n)\} \quad (5)$$

When the DL signal is transmitted, the DL IF signal input to the first mixer 24-n is multiplied by the LO signal also input to the first mixer 24-n, and thus the DL IF signal is up-converted to a carrier frequency band signal (Step 105). The DL IF signal up-converted to a carrier frequency band signal is referred to as the DL signal. Since the DL signal $D_{RFn}(t)$ of the n-system is obtained by multiplying the LO signal by the DL IF signal, Expression (6) is obtained by Expressions (1) and (5). In Expression (6), the change of the phase of the DL IF signal due to the cable 19-n is ignored for the sake of simplicity.

[Expression 6]

$$\begin{aligned}D_{RFn}(t) &= D_{IFn}(t) \cdot L_{RFn}(t) \\ &= D_{BBn}(t) \cdot \exp[j\{(\omega_{LO} + \omega_{IF})t + k\varphi_n + k\theta_n\}].\end{aligned} \quad (6)$$

Figure 5:
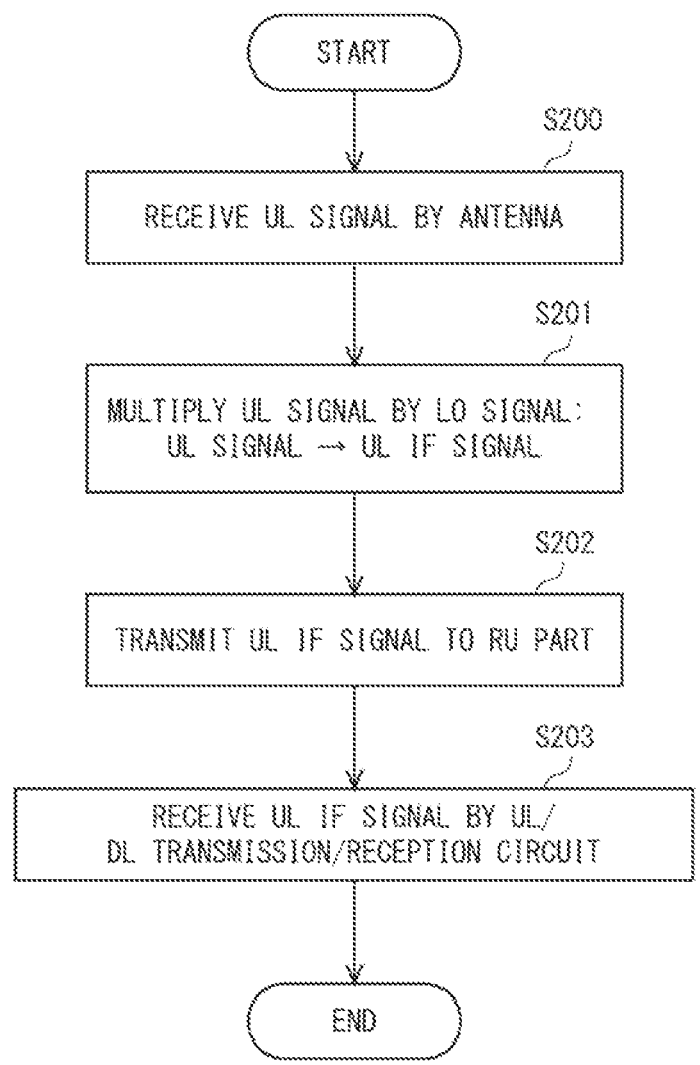
FIG. 5 is a flowchart of a UL signal according to the second example embodiment of the present disclosure.

Next, reception of the UL signal will be described with reference to FIG. 5. FIG. 5 is a flowchart showing a flow of the UL signal. The out-of-band component of the UL signal received by the antenna 30 (Step 200) is removed by the fifth bandpass filter 29.

When the UL signal is being communicated, the second switch 27 and the third switch 28 are switched so that the path of the second mixer 25 is selected. The UL signal is multiplied by the LO signal in the second mixer 25 and down-converted to an intermediate frequency band signal (Step 201). A UL IF signal $U_{IFn}(t)$ of the n-system can be expressed as follows.

[Expression 7]

$$\begin{aligned}U_{IFn}(t) &= U_{RFn}(t) \cdot L_{RFn}^{-1}(t) \\ &= U_{BBn}(t) \cdot \exp[j\{(\omega_{RF} - \omega_{LO})t - k\varphi_n - k\theta_n\}], \\ &= U_{BBn}(t) \cdot \exp[j\{\omega_{IF}t - k\varphi_n - k\theta_n\}].\end{aligned} \quad (7)$$

$U_{RFn}(t)$ represents the UL signal received by the antenna 30-$n$, and $U_{BBn}(t)$ represents the baseband component of the UL signal. Expression (7) indicates that the contributions of the phase $\varphi_n$ by the variable phase shifter 16-$n$ and the phase $\theta_n$ generated by the transmission by the cable 19-$n$ are reverse in positive and negative to those in Expression (6).

The UL IF signal is transmitted in a direction the reverse of that in which the DL IF signal is transmitted along the same path as that of the DL IF signal. The UL IF signal is transmitted from the DA part 20 to the RU part 10 (Step 202). The UL IF signal is input to the DL/UL signal transmission/reception circuit 11 (Step 203). The UL IF signal input to the DL/UL signal transmission/reception circuit 11 is down-converted to a baseband signal and demodulated in a manner similar to that described above.

A spatial multiplexing of a DL signal by the MIMO transmission technology is applied by estimating a propagation channel from a received UL signal and making the DL signal subject to precoding. In the D-MIMO apparatus as described in the present disclosure, regarding the estimation of a propagation channel, the propagation channel and the influence of a delay of the LO IF signal due to the cable cannot be separated, and thus the correction value including the delay due to the cable 19 is subject to precoding. However, as shown in Expressions (6) and (7), since the influence of the delay of the LO IF signal due to the cable 19 is reverse in positive and negative between UL and DL, there is a problem that the correction is not made by precoding and the spatial multiplexing of the DL signal is not implemented. On the other hand, the influence of the DL/UL signal due to the cable can be regarded as being a part of the radio wave propagation between the UE and the D-MIMO apparatus, and thus the correction is made by precoding. Therefore, the delay of the LO IF signal due to the cable 19 may be corrected, and the phases of the LO signal in the respective DA parts may be made to coincide with each other. At this time, the phase of the LO signal is adjusted by the variable phase shifter 16.

Figure 6:
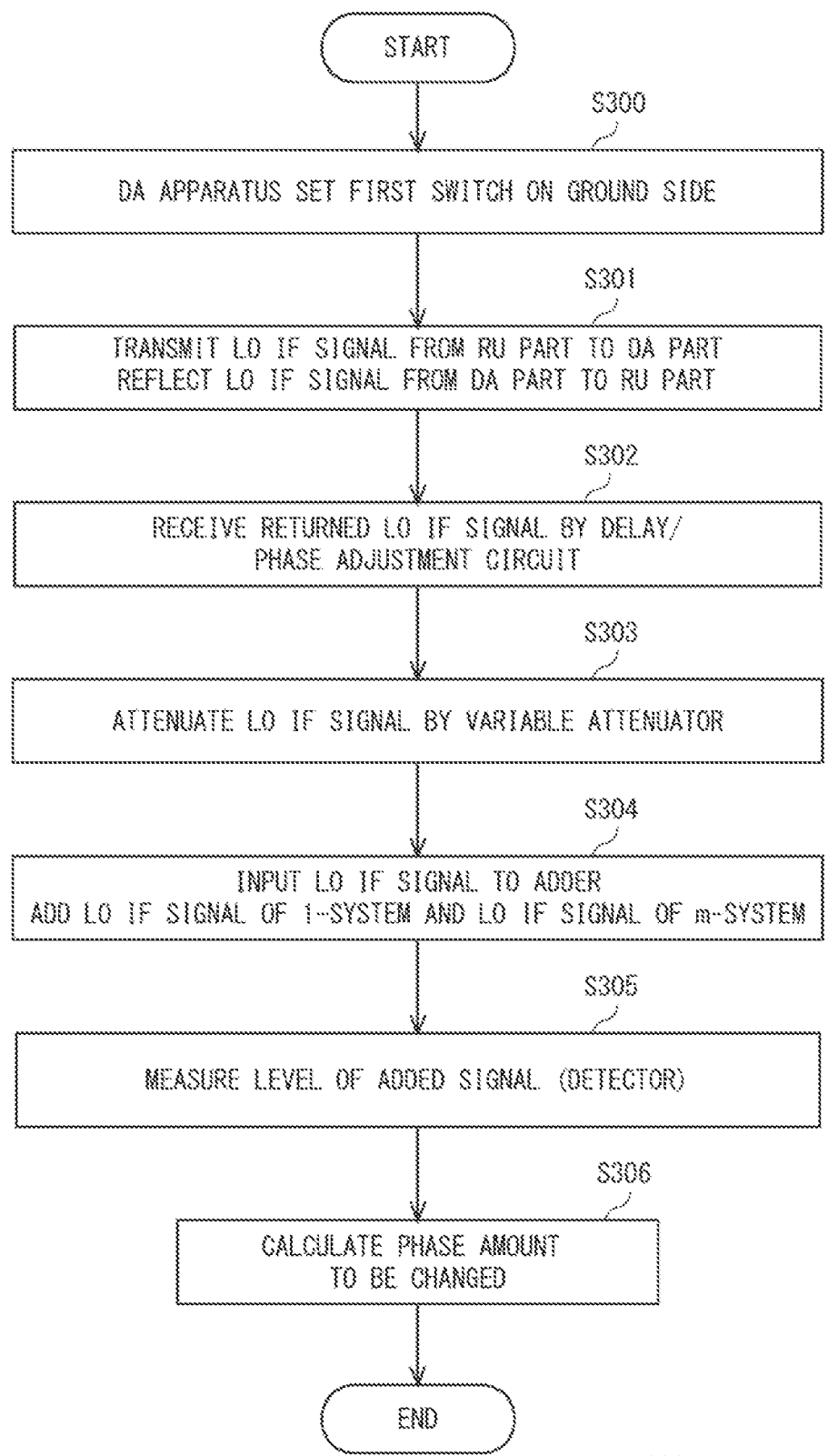
FIG. 6 is a flowchart of a calibration of an LO signal according to the second example embodiment of the present disclosure.

A calibration method for making the phases of the LO signals coincide with each other will be described below with reference to FIG. 6. FIG. 6 is a flowchart showing a flow of a calibration of the LO signal. At the time of the calibration, the first switch 21 of the DA part 20 is switched so that it is connected to the ground side thereof (Step 300). By doing so, the LO IF signal transmitted through the cable 19 is reflected at the part of the DA part 20 where the first switch 21 is connected to the ground side thereof, and returned to the RU part (Step 301). In this example embodiment, although the switch is connected to the ground side of the DA part 20 at the time of the calibration, the signal line may be opened at the point of each DA part 20 to which one of the cables 19 is connected or near the first switch 21 of each DA part 20 to reflect the LO IF signal.

In this example embodiment, the signals superimposed on the cable 19 are the UL IF signal, the DL IF signal, and the LO IF signal. However, in addition to these signals, a power supply and a control signal for TDD or the like may be superimposed on the cable 19. In this case, for example, a capacitor (not shown) is added between the point of each DA part 20 to which one of the cables 19 is connected and the first switch 21 of each DA part 20. A capacitance of the capacitor is preferably set so that the LO IF signal, the DL IF signal, and the UL IF signal are allowed to pass through, but the power supply and the control signal do not allowed to pass through. The power supply and the control signal are extracted in the path between the point of each DA part 20 to which one of the cables 19 is connected and each of the capacitors. By doing so, even when the first switch 21 is connected to the ground side, the power supply and the control signal can be used without change.

Further, in this example embodiment, the first switch 21 is disposed at the point of each DA part 20 to which one of the cables 19 is connected. However, it may instead be disposed, for example, between the third bandpass filter 22 of each DA part 20 and the frequency multiplier 23 of each DA part 20.

The reflected LO IF signal passes through both the second bandpass filter 17 and the variable phase shifter 16, and is input by the coupler 15 to the delay/phase adjustment circuit 18 (Step 302).

A signal input to and output from the delay/phase adjustment circuit 18 of the RU part 10 will be described below. Details of the delay/phase adjustment circuit 18 are as shown in FIG. 3. The power of the returned LO IF signal input to the delay/phase adjustment circuit 18 is adjusted by the variable attenuator 41 (Step 303). Then the returned LO IF signal selected by the fourth switch 42 is input to the adder 43 (Step 304).

An LO IF signal L "$_{IFm}(t)$ of an m-system (m is an integer from 2 to N) input to the adder 43 of the delay/phase adjustment circuit 18 is expressed as follows. Here, the returned LO IF signal is reflected by the DA part 20. Therefore, the LO IF signal passes through the variable phase shifter 16 and the cable 19 twice. Thus, the amount of phase change is twice as large as that of the LO IF signal (Expression (4)) transmitted to the DA. Here, $\varphi_m$ is a phase amount adjusted by the variable phase shifter 16-$m$ of the m-system. Further, $\theta_m$ is an amount of phase delay due to transmission of the cable 19 in the m-system.

[Expression 8]

$$L''_{IFm}(t) = \exp\left\{j\left(\frac{\omega_{LO}}{k}t + 2\varphi_m + 2\theta_m\right)\right\}. \tag{8}$$

The "$2\varphi_m+2\theta_m$" in Expression 8 indicates the amount of phase change.

The detector 44 measures the signal level of the LO IF signal added by the adder 43 (Step 305), and adjusts the phase of the variable phase shifter 16-$m$ so that the signal level is minimized (Step 306). At this time, the phase of the 1-system and the phase of the m-system satisfy the following Expression (9). Note that Mod (A, B) indicates a remainder of A/B. The remainder is used because it is considered that the cable 19 used is sufficiently longer than the wavelength of the LO IF signal, and the phase has been rotated a plurality of times. The $-\pi$ on the right side of the Expression (9) indicates that the phase of the 1-system has been inverted because the phase $\varphi_m$ has been set so as to cancel the signal.

[Expression 9]

$$\text{Mod}(2\varphi_m+2\theta_m, 2\pi) = \text{Mod}(2\varphi_1+2\theta_1-\pi, 2\pi) \tag{9}$$

When a phase $\varphi_1$ of the variable phase shifter 16-1 of the 1-system used as a reference is set to $\pi/2$ at the time of the calibration, a phase amount $\varphi_m$ changed by the variable phase shifter 16-$m$ of the m-system is as follows. Note that the floor represents a truncation after the decimal point.

[Expression 10]

$$\varphi_m = \text{Mod}(\theta_1 - \theta_m, \pi) \tag{10}$$
$$= \theta_1 - \theta_m - a_m\pi$$
$$\because a_m = \text{floor}\left(\frac{\theta_1 - \theta_m}{\pi}\right)$$

When the phase $\varphi_m$ of the variable phase shifter 16-*m* is set as in Expression (10), the LO IF signal of the m-system at the point of each DA part 20 to which one of the cables 19 is connected is expressed by the following Expression (11) based on Expression (4).

[Expression 11]

$$L'_{IFm}(t) = \exp\left[j\left\{\frac{\omega_{LO}}{k}t + (\theta_1 - \theta_m - a_m\pi) + \theta_m\right\}\right]$$
$$= \exp\left[j\left\{\frac{\omega_{LO}}{k}t + \theta_1 - a_m\pi\right\}\right] \quad (11)$$

In operation, the phase $\varphi_1$ of the 1-system used as a reference is set to 0. In the 1-system, $a_1=0$ holds based on Expression (10). In this case, the LO IF signal of the 1-system at the point of each DA part 20 to which one of the cables 19 is connected is expressed by the following Expression (12) based on Expression (11).

[Expression 12]

$$L'_{IF1}(t) = \exp\left\{j\left(\frac{\omega_{LO}}{k}t + \theta_1\right)\right\} \quad (12)$$

Based on Expressions (11) and (12), since $a_m$ is an integer, the phase of the LO IF signal of the m-system differs from the phase of the LO IF signal of the 1-system by a multiple of $\pi$. Therefore, the phase of the LO IF signal of the m-system and the phase of the LO IF signal of the 1-system either coincide with each other or are inverted with respect to each other.

When the LO IF signal of which the phase has been adjusted is multiplied by the frequency multiplier 23 in a manner similar to Expression (5), the LO signal is expressed by the following Expression (13) based on Expression (11). Note that, in this example embodiment, since the multiplication number k is an even number, that is, a multiple of 2, $ka_m\pi$ is an integer multiple of $2\pi$, which can be ignored.

[Expression 13]

$$L_{RFm}(t)=\exp\{j(\omega_{LO}t+k\theta_1-ka_m\pi)\}=\exp\{j(\omega_{LO}t+k\theta_1)\} \quad (13)$$

Similarly, an expression expressing an LO signal obtained by multiplying the LO IF signal of the 1-system used as a reference in the calibration is obtained. As described above, $a_1=0$. Therefore, based on Expression (13), the LO signal is as shown in the following Expression (14), and the phase thereof coincides with that of the LO signal of the m-system.

[Expression 14]

$$L_{RF1}(t)=\exp\{j(\omega_{LO}t+k\theta_1)\}=L_{RFm}(t) \quad (14)$$

It is preferable that the above calibration be first performed after the apparatus is installed in a place where it is to be operated and before its operation starts. After the above calibration is performed, a calibration can be performed again based on, for example, the elapsed time from and temperature fluctuations in the previous calibration. Further, the communication quality of the DL signal is generally correlated with a received signal level of the UL signal, and therefore it is possible to employ a method in which a threshold value is set for the communication quality of the DL signal relative to the received signal level of the UL signal and a calibration is performed again when this threshold value is exceeded.

In the case of the TDD system like in the radio base station system 1 described in this example embodiment, the frequencies of DL and UL are equal, and therefore it is possible to estimate, for example, a propagation channel indicating the state of the communication channel from the received UL signal. By utilizing this propagation channel and using the maximum ratio combining and the spatial multiplexing technique, it is possible to increase the communication quality and the communication capacity of the communication channel.

According to this example embodiment, after the D-MIMO apparatus is installed at a place where it is to be operated, it is possible to perform a calibration of the apparatus without using an external measuring instrument. Thus, it is possible to make the phases of the LO signals in the respective DA parts 20 coincide with each other.

Third Example Embodiment

Figure 7:
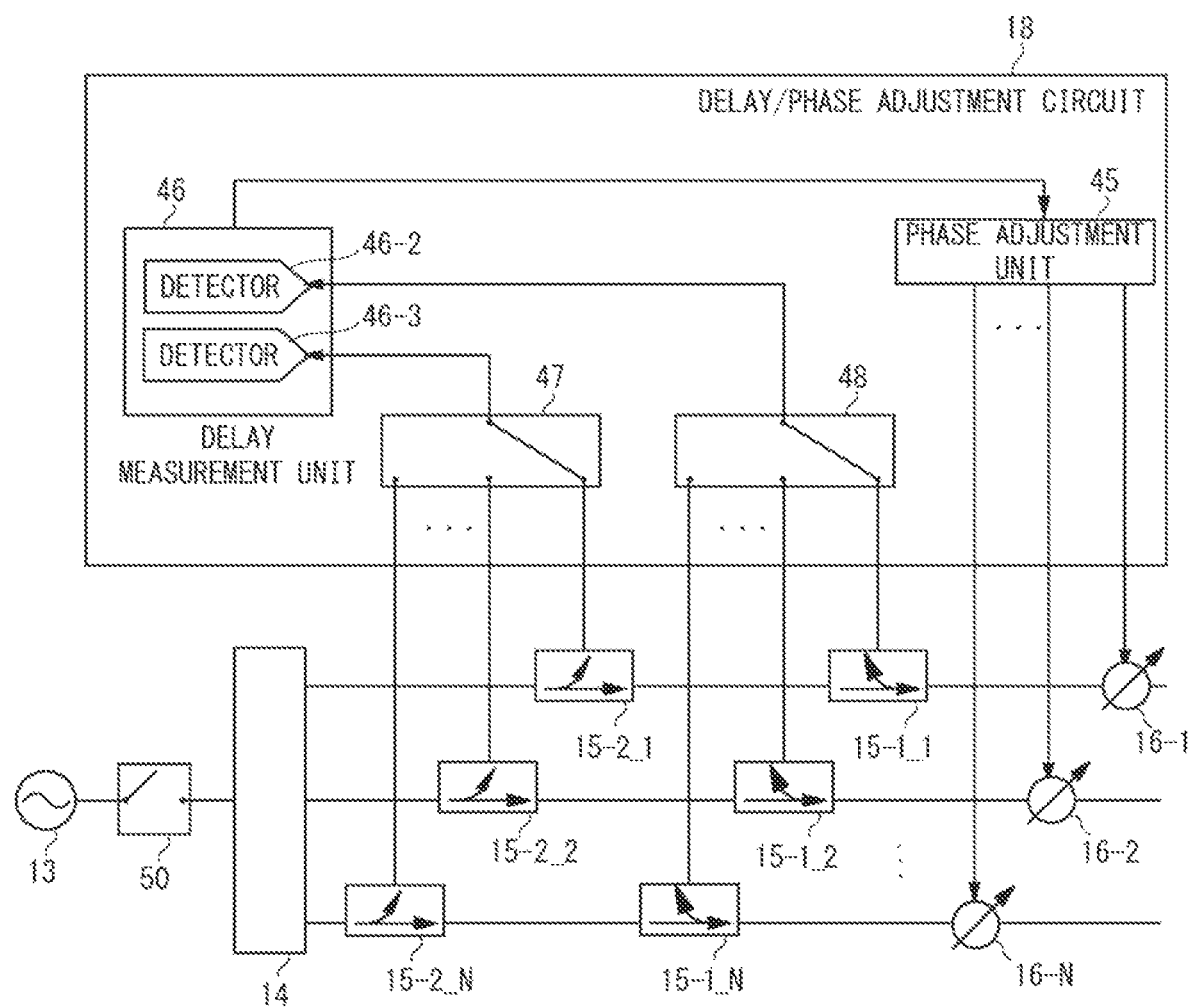
FIG. 7 is a diagram of a peripheral configuration of a calibration circuit according to a third example embodiment of the present disclosure.

The radio base station system 1 described in the second example embodiment can be used only when the multiplication number of the frequency multiplier of the LO signal is an even number. On the other hand, in this example embodiment, both odd and even multiplication numbers can be used. FIG. 7 shows a peripheral configuration of the delay/phase adjustment circuit 18 according to this example embodiment. The configurations of the radio base station system 1 other than those shown in FIG. 7 are similar to those of the second example embodiment.

In this example embodiment, unlike the second example embodiment, two switches of a fifth switch 47 and a sixth switch 48 are respectively provided in the paths of the LO IF signals in the delay/phase adjustment circuit 18. Further, first couplers 15-1_1 to 15-1_N and second couplers 15-2_1 to 15-2_N are connected to the fifth switch 47 and the sixth switch 48, respectively. Note that, in the following description, the first couplers 15-1_1 to 15-1_N and the second couplers 15-2_1 to 15-2_N, respectively, are simply referred to as the first coupler 15-1 and the second coupler 15-2 unless it is particularly necessary to distinguish them from each other. The variable phase shifter 16 may be positioned between the divider 14 and the second coupler 15-2 or between the two couplers 15-1 and 15-2. Further, in the delay/phase adjustment circuit 18 according to this example embodiment, a delay measurement unit 46 is added between the switches 47 and 48 and the variable phase shifter 16. The delay measurement unit 46 includes two detectors 46-2 and 46-3.

Figure 8:
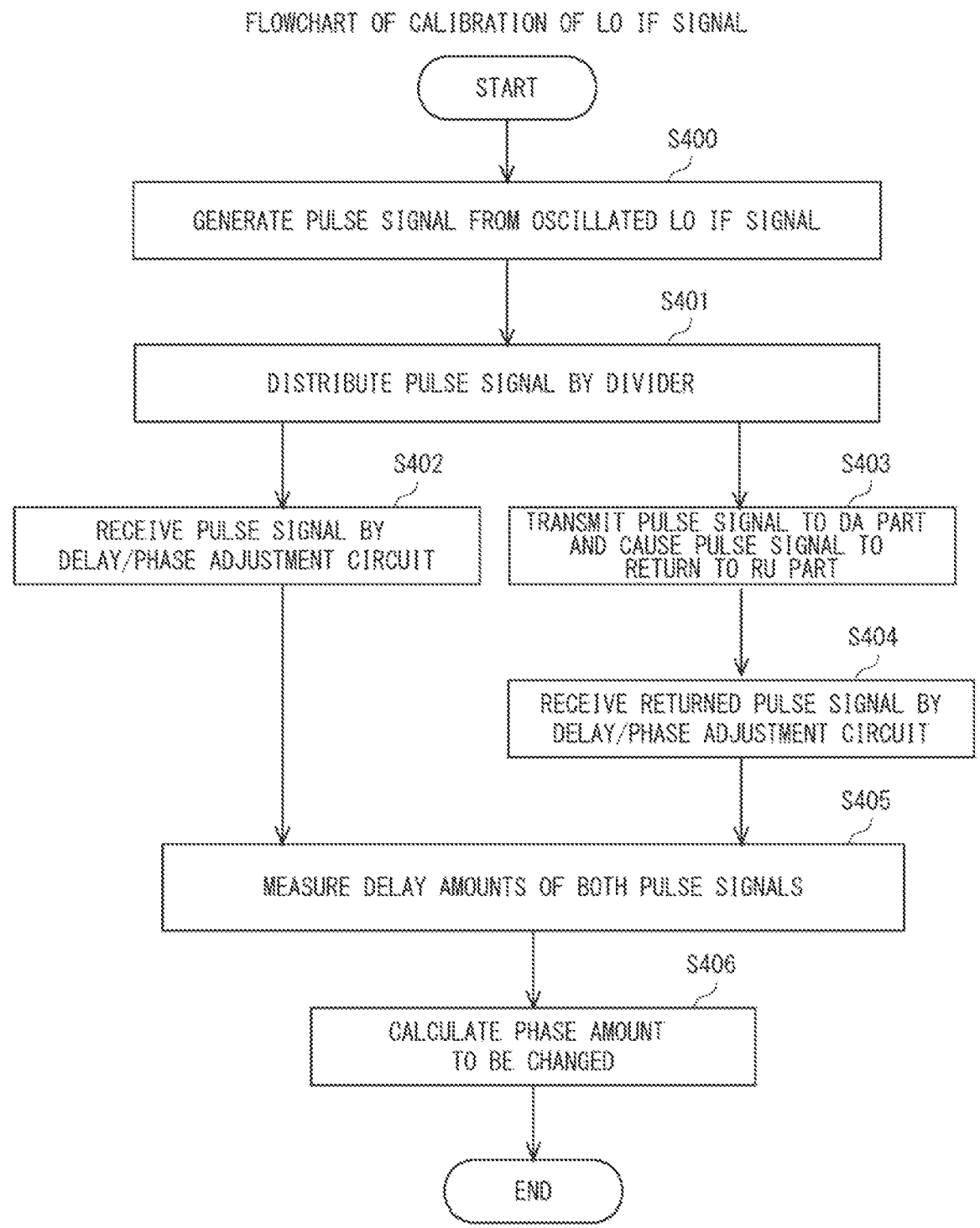
FIG. 8 is a flowchart of a calibration of the LO signal according to the third example embodiment of the present disclosure.

In operation, like in the second example embodiment, the phase amount is set in the variable phase shifter 16 so that the phases of the LO signals in the respective DA parts 20 are made equal. A method for determining this phase amount will be described below with reference to FIG. 8. FIG. 8 is a flowchart of a calibration of the LO signal in this example embodiment.

The local oscillator 13 generates an LO IF signal as in the case of the second example embodiment. At the time of the calibration, a seventh switch 50 repeats ON and OFF to thereby generate a pulse signal of the LO IF signal (Step 400). Although an example in which a pulse signal is used will be described in this example embodiment, a step signal may instead be used. The pulse signal of the LO IF signal is distributed by the divider 14 (Step 401). Further, a part of the LO IF signal distributed by the second coupler 15-2 is input to the fifth switch 47, and is then received by the delay/phase adjustment circuit 18 (Step 402).

At the time of the calibration, the first switch 21 of the DA part 20 is connected to the ground side thereof like in the second example embodiment, and the LO IF signal transmitted to the first switch 21 is reflected. The reflected LO IF signal is returned to the RU part 10 (Step 403), and a part of the returned LO IF signal is input to the fifth switch 47 by the first coupler 15-1, and is then received by the delay/phase adjustment circuit 18 (Step 404).

When the signals of the n-system are calibrated, the switches 47 and 48 are set so as to make the signals from the n-system pass through them. Here, $\tau_n$ is a delay time required for a signal to be transmitted through the cable 19-$n$ of the n-system. At this time, $\tau_n$ satisfies $\theta_n=(\omega_{LO}/k)\tau_n$. The phase amount $\varphi_n$ changed by the variable phase shifter 16-$n$ of the n-system is set to zero at the time of the calibration. Therefore, the LO IF signal returned to the delay/phase adjustment circuit 18 can be expressed by the following Expression (15).

[Expression 15]

$$L''_{IFn}(t) = \exp\left\{j\left(\frac{\omega_{LO}}{k}t + 2\frac{\omega_{LO}}{k}\tau_n\right)\right\} \quad (15)$$

Figure 9:
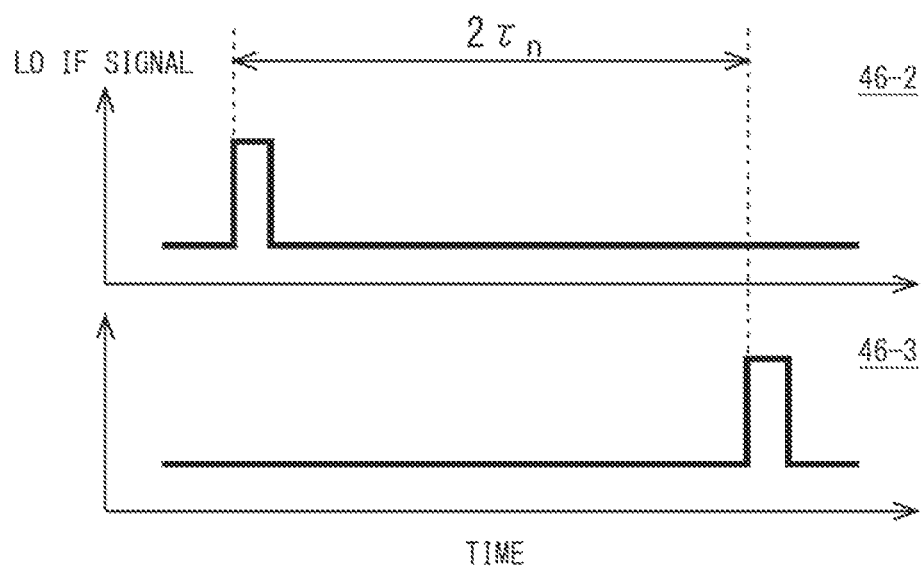
FIG. 9 is a diagram showing a result of measurement of an LO IF signal according to the third example embodiment of the present disclosure.

Pulse-like LO IF signals that have passed through the switches 47 and 48 are measured by the detectors 46-2 and 46-3, respectively, and a time difference between the time at which the LO IF signal reaches the detector 46-2 and the time at which the LO IF signal reaches the detector 46-3 is measured thereby (Step 405). At this time, the waveforms of the LO IF signals in the detectors 46-2 and 46-3 are obtained as a result of the measurement as shown in FIG. 9. The difference between the arrival times of the LO IF signals obtained by the detectors 46-2 and 46-3, respectively, is a delay time $2\tau_n$ of Expression (15).

The phase amount $\varphi_n$ changed by the variable phase shifter 16-$n$ for making the phases of the LO signals in the respective DA parts 20 coincide with each other is calculated by the following Expression (16) (Step 406).

[Expression 16]

$$\varphi_n = 2\pi - \mathrm{Mod}\left(\frac{\omega_{LO}}{k}\tau_n, 2\pi\right). \quad (16)$$

When this phase amount $\varphi_n$ is set, the LO IF signal $L'_{IFn}$ in the DA part 20 expressed by Expression (4) becomes as shown in Expression (17), and the LO IF signals that are made equal in phase are obtained in each DA part 20 regardless of the system.

[Expression 17]

$$L'_{IFn}(t) = \exp\left[j\left\{\frac{\omega_{LO}}{k}t + 2\pi - \mathrm{Mod}\left(\frac{\omega_{LO}}{k}\tau_n, 2\pi\right) + \frac{\omega_{LO}}{k}\tau_n\right\}\right] \quad (17)$$

$$= \exp\left[j\left\{\frac{\omega_{LO}}{k}t\right\}\right].$$

Fourth Example Embodiment

Figure 10:
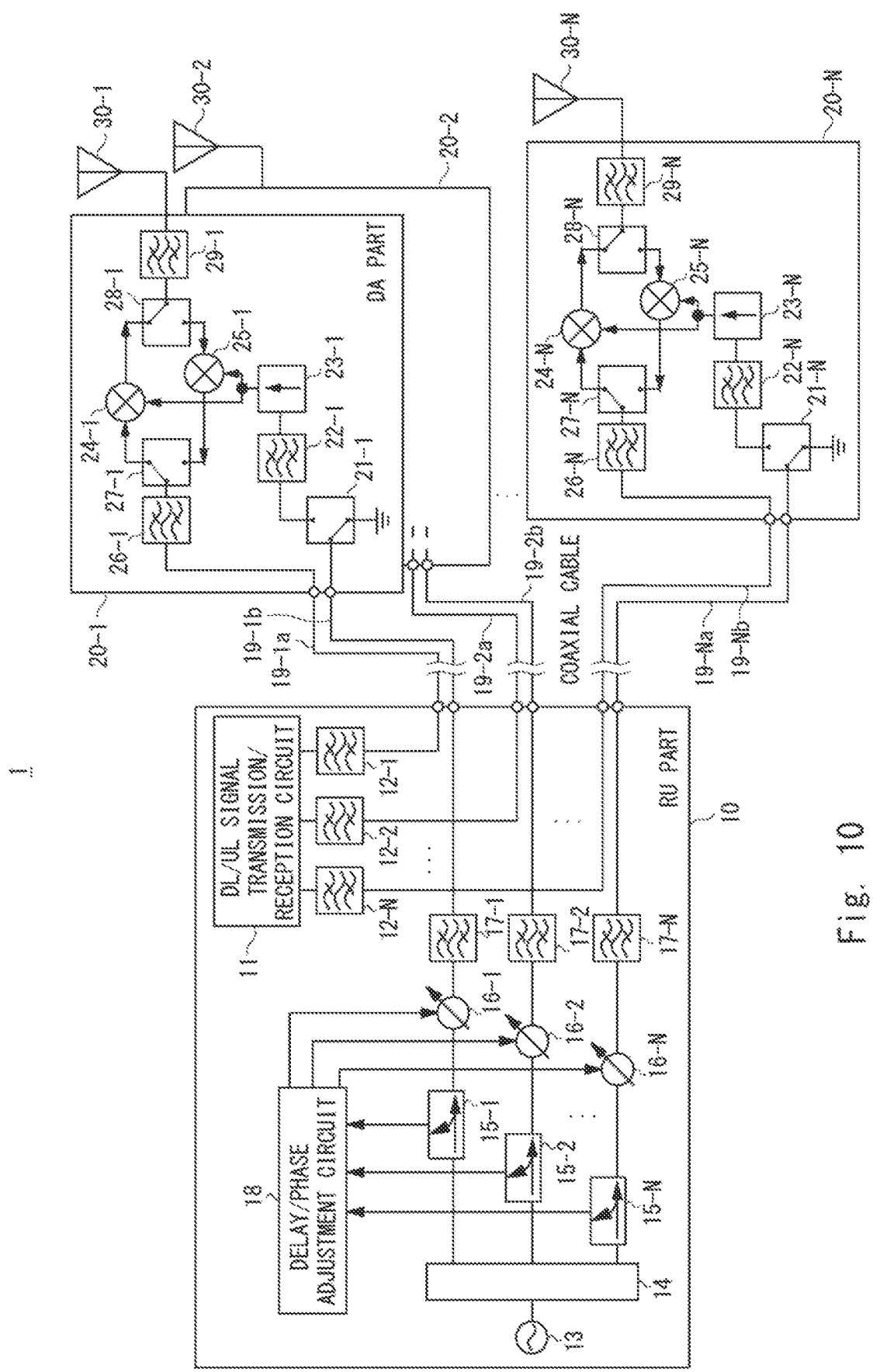
FIG. 10 is a configuration diagram of a radio base station system according to a fourth example embodiment of the present disclosure.

FIG. 10 shows a configuration example of the radio base station system 1 according to this example embodiment. The radio base station system 1 in this example embodiment includes the RU part 10 and the plurality of DA parts 20 as in the case of the second example embodiment.

This example embodiment differs from the second example embodiment in that two cables 19 connect the RU part 10 to the DA part 20. That is, the DL/UL IF signal and the LO IF signal are not superimposed in the RU part 10, and are transmitted by different cables 19-1$a$ to 19-N$a$ and 19-1$b$ to 19-N$b$, respectively. Note that, in the following description, the cables 19-1$a$ to 19-N$a$ and the cables 19-1$b$ to 19-N$b$, respectively, are simply referred to as the cable 19-1$a$ and the cable 19-1$b$ unless it is particularly necessary to distinguish them from each other. The configurations other than the above ones are similar to those of the second and the third example embodiments. That is, the delay/phase adjustment circuit 18 in this example embodiment is similar to that of each of the second and the third example embodiments.

Although the example embodiments of the present disclosure have been described in detail with reference to the drawings, the specific configurations are not limited to the above-described example embodiments, and various design changes and the like can be made without departing from the scope and spirit of the present disclosure.

An object of the present disclosure is to provide a calibration circuit capable of performing, in an apparatus in which a plurality of antenna parts can be disposed in a distributed manner in a radio communication system, calibrations of phases of the plurality of antenna parts without using an external measuring instrument.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A calibration circuit in a radio base station system, the radio base station system comprising a remote unit part and a plurality of distributed antenna parts connected to the remote unit part through a plurality of respective cables, the calibration circuit comprising:

a detection unit configured to detect a plurality of local oscillation signals, the plurality of local oscillation signals being output from a local oscillator of the remote unit part and being respectively reflected from the plurality of distributed antenna parts through the plurality of cables; and a phase adjustment unit configured to adjust a phase of each of the plurality of local oscillation signals that are output through the plurality of respective cables from the remote unit part based on a result of the detection.

(Supplementary Note 2)

The calibration circuit according to Supplementary note 1, further comprising an adder configured to add the plurality of reflected local oscillation signals, wherein the detection unit detects a signal level of each of the plurality of the added local oscillation signals, and the phase adjustment unit adjusts the phase based on each of the detected signal levels.

(Supplementary Note 3)

The calibration circuit according to Supplementary note 2, wherein the phase adjustment unit adjusts the phase so that each of the signal levels is minimized.

(Supplementary Note 4)

The calibration circuit according to Supplementary note 2 or 3, further comprising a level adjustment unit configured to adjust the signal levels of the plurality of local oscillation signals input to the adder so that the signal levels become equal.

(Supplementary Note 5)

The calibration circuit according to Supplementary note 2 or 3, further comprising a selection unit configured to select two local oscillation signals input to the adder from among the plurality of reflected local oscillation signals.

(Supplementary Note 6)

The calibration circuit according to Supplementary note 1, wherein the local oscillation signal is a pulse signal or a step signal.

(Supplementary Note 7)

The calibration circuit according to Supplementary note 6, wherein the detection unit detects the local oscillation signal output from the local oscillator and detects the reflected local oscillation signal, and the phase adjustment unit adjusts the phase based on a time difference between a result of the detection of the local oscillation signal output from the local oscillator and a result of the detection of the reflected local oscillation signal.

(Supplementary Note 8)

The calibration circuit according to Supplementary note 7, further comprising a selection unit configured to select one local oscillation signal input to the detection unit from among the plurality of reflected local oscillation signals.

(Supplementary Note 9)

A remote unit apparatus connected to a plurality of distributed antenna apparatuses through a plurality of respective cables in a radio base station system, the remote unit apparatus comprising:

a local oscillator configured to generate a local oscillation signal;

a plurality of variable phase shifters each configured to output the local oscillation signal to a corresponding one of the plurality of cables; and a calibration circuit configured to control the plurality of variable phase shifters, the calibration circuit comprising:

a detection unit configured to detect a plurality of the local oscillation signals respectively reflected from the plurality of distributed antenna apparatuses through the plurality of cables; and a phase adjustment unit configured to adjust an amount of phase change of each of the plurality of variable phase shifters based on a result of the detection.

(Supplementary Note 10)

The remote unit apparatus according to Supplementary note 9, further comprising:

a divider configured to distribute the local oscillation signal output from the local oscillator to each of the plurality of cables, and a plurality of couplers configured to distribute the plurality of respective reflected local oscillation signals to the calibration circuit between the divider and the plurality of variable phase shifters.

(Supplementary Note 11)

The remote unit apparatus according to Supplementary note 10, further comprising a transmission/reception circuit configured to transmit and receive a downlink signal and an uplink signal to and from the plurality of distributed antenna apparatuses.

(Supplementary Note 12)

The remote unit apparatus according to Supplementary note 11, wherein the downlink signal and the uplink signal are signals for MIMO transmission.

(Supplementary Note 13)

The remote unit apparatus according to Supplementary note 11 or 12, wherein the local oscillation signal is superimposed on the downlink signal and the uplink signal in each of the plurality of cables.

(Supplementary Note 14)

The remote unit apparatus according to Supplementary note 11 or 12, wherein the local oscillation signal and the downlink and the uplink signals are transmitted through the cables different from each other.

(Supplementary Note 15)

The remote unit apparatus according to Supplementary note 13 or 14, wherein the local oscillation signal is superimposed on a power supply or a control signal in each of the plurality of cables.

(Supplementary Note 16)

A radio base station system comprising a remote unit part and a plurality of distributed antenna parts connected to the remote unit part through a plurality of respective cables, the remote unit part comprising:

a local oscillator configured to generate a local oscillation signal;

a plurality of variable phase shifters each configured to output the local oscillation signal to a corresponding one of the plurality of cables; and a calibration circuit configured to control the plurality of variable phase shifters, the calibration circuit comprising:

a detection unit configured to detect a plurality of the local oscillation signals respectively reflected from the plurality of distributed antenna parts through the plurality of cables; and a phase adjustment unit configured to adjust an amount of phase change of each of the plurality of variable phase shifters based on a result of the detection.

(Supplementary Note 17)

The radio base station system according to Supplementary note 16, wherein each of the plurality of distributed antenna parts comprises a switch configured to switch an operation for reflecting the local oscillation signal.

(Supplementary Note 18)

The radio base station system according to Supplementary note 17, wherein the switch short-circuits the cable to a ground when the local oscillation signal is reflected.

(Supplementary Note 19)

The radio base station system according to Supplementary note 17, wherein the switch opens an end of the cable when the local oscillation signal is reflected.

(Supplementary Note 20)

The radio base station system according to any one of Supplementary notes 17 to 19, wherein the switch performs switching between the operation for reflecting the local oscillation signal and an operation for transmitting and receiving a downlink signal and an uplink signal to and from a terminal apparatus using the local oscillation signal.

(Supplementary Note 21)

The radio base station system according to Supplementary note 20, wherein the local oscillation signal is superimposed on the downlink signal and the uplink signal in each of the plurality of cables, the radio base station system further comprises a signal processing circuit configured to multiply a multiplication signal by the downlink signal received from the cable or the uplink signal received from the terminal apparatus, the multiplication signal being obtained by multiplying the local oscillation signal, and the switch connects the cable to the signal processing circuit when the downlink signal and the uplink signal are transmitted and received.

(Supplementary Note 22)

The radio base station system according to Supplementary note 20, wherein the local oscillation signal and the downlink and the uplink signals are transmitted through cables different from each other, the radio base station system further comprises:

a frequency multiplier configured to multiply the local oscillation signal; and a multiplier configured to multiply the multiplication signal multiplied by the frequency multiplier by the downlink signal received from the cable or the uplink signal received from the terminal apparatus, and the switch connects the cable to the frequency multiplier when the downlink signal and the uplink signal are transmitted and received.

(Supplementary Note 23)

The radio base station system according to Supplementary note 21 or 22, wherein the local oscillation signal is further superimposed on a power supply or a control signal in each of the plurality of cables, and the radio base station system further comprises a circuit configured to extract the power supply or the control signal from the superimposed signal and a circuit configured to extract the local oscillation signal from the superimposed signal, these circuits being provided between the cable and the switch.

(Supplementary Note 24)

A calibration method performed in a radio base station system, the radio base station system comprising a remote unit part and a plurality of distributed antenna parts connected to the remote unit part through a plurality of respective cables, the calibration method comprising:

detecting a plurality of local oscillation signals, the plurality of local oscillation signals being output from a local oscillator of the remote unit part and being respectively reflected from the plurality of distributed antenna parts through the plurality of cables; and adjusting a phase of each of the plurality of local oscillation signals that are output through the plurality of respective cables from the remote unit part based on a result of the detection.

What is claimed is:

1. A calibration circuit in a radio base station system, the radio base station system comprising a remote unit part and a plurality of distributed antenna parts connected to the remote unit part through a plurality of respective cables, the calibration circuit comprising:

a detection unit configured to detect a plurality of local oscillation signals, the plurality of local oscillation signals being output from a local oscillator of the remote unit part and being respectively reflected from the plurality of distributed antenna parts through the plurality of respective cables; and a phase adjustment unit configured to adjust a phase of each of the plurality of local oscillation signals that are output through the plurality of respective cables from the remote unit part based on a result of the detection.

2. The calibration circuit according to claim 1, further comprising an adder configured to add the plurality of reflected local oscillation signals, wherein the detection unit detects a signal level of each of the plurality of the added local oscillation signals, and the phase adjustment unit adjusts the phase based on each of the detected signal levels.

3. The calibration circuit according to claim 2, wherein the phase adjustment unit adjusts the phase so that each of the signal levels is minimized.

4. The calibration circuit according to claim 2, further comprising a selection unit configured to select two local oscillation signals input to the adder from among the plurality of reflected local oscillation signals.

5. The calibration circuit according to claim 1, wherein the local oscillation signal is a pulse signal or a step signal.

6. The calibration circuit according to claim 5, wherein the detection unit detects the local oscillation signal output from the local oscillator and detects the reflected local oscillation signal, and the phase adjustment unit adjusts the phase based on a time difference between a result of the detection of the local oscillation signal output from the local oscillator and a result of the detection of the reflected local oscillation signal.

7. A remote unit apparatus connected to a plurality of distributed antenna apparatuses through a plurality of respective cables in a radio base station system, the remote unit apparatus comprising:

a local oscillator configured to generate a local oscillation signal;

a plurality of variable phase shifters each configured to output the local oscillation signal to a corresponding one of the plurality of respective cables; and a calibration circuit configured to control the plurality of variable phase shifters, the calibration circuit comprising:

a detection unit configured to detect a plurality of the local oscillation signals respectively reflected from the plurality of distributed antenna apparatuses through the plurality of respective cables; and a phase adjustment unit configured to adjust an amount of phase change of each of the plurality of variable phase shifters based on a result of the detection.

8. The remote unit apparatus according to claim 7, further comprising:

a divider configured to distribute the local oscillation signal output from the local oscillator to each of the plurality of cables, and a plurality of couplers configured to distribute the plurality of respective reflected local oscillation signals to the calibration circuit between the divider and the plurality of variable phase shifters.

9. The remote unit apparatus according to claim 8, further comprising a transmission/reception circuit configured to transmit and receive a downlink signal and an uplink signal to and from the plurality of distributed antenna apparatuses.

10. The remote unit apparatus according to claim 9, wherein the downlink signal and the uplink signal are signals for MIMO transmission.

11. The remote unit apparatus according to claim 9, wherein the local oscillation signal is superimposed on the downlink signal and the uplink signal in each of the plurality of respective cables.

12. The remote unit apparatus according to claim 9, wherein the local oscillation signal and the downlink and the uplink signals are transmitted through the cables different from each other.

13. The remote unit apparatus according to claim 11, wherein the local oscillation signal is superimposed on a power supply or a control signal in each of the plurality of respective cables.

14. A radio base station system comprising a remote unit part and a plurality of distributed antenna parts connected to the remote unit part through a plurality of respective cables, the remote unit part comprising:
  a local oscillator configured to generate a local oscillation signal;
  a plurality of variable phase shifters each configured to output the local oscillation signal to a corresponding one of the plurality of respective cables; and
  a calibration circuit configured to control the plurality of variable phase shifters,
  the calibration circuit comprising:
    a detection unit configured to detect a plurality of the local oscillation signals respectively reflected from the plurality of distributed antenna parts through the plurality of respective cables; and
    a phase adjustment unit configured to adjust an amount of phase change of each of the plurality of variable phase shifters based on a result of the detection.

15. The radio base station system according to claim 14, wherein each of the plurality of distributed antenna parts comprises a switch configured to switch an operation for reflecting the local oscillation signal.

16. The radio base station system according to claim 15, wherein the switch short-circuits the cables cable to a ground when the local oscillation signal is reflected.

17. The radio base station system according to claim 15, wherein the switch opens an end of the cables when the local oscillation signal is reflected.

18. The radio base station system according to claim 15, wherein the switch performs switching between the operation for reflecting the local oscillation signal and an operation for transmitting and receiving a downlink signal and an uplink signal to and from a terminal apparatus using the local oscillation signal.

19. The radio base station system according to claim 18, wherein
  the local oscillation signal is superimposed on the downlink signal and the uplink signal in each of the plurality of respective cables,
  the radio base station system further comprises a signal processing circuit configured to multiply a multiplication signal by the downlink signal received from the cables or the uplink signal received from the terminal apparatus, the multiplication signal being obtained by multiplying the local oscillation signal, and
  the switch connects the cables to the signal processing circuit when the downlink signal and the uplink signal are transmitted and received.

20. The radio base station system according to claim 18, wherein
  the local oscillation signal and the downlink and the uplink signals are transmitted through cables different from each other,
  the radio base station system further comprises:
    a frequency multiplier configured to multiply the local oscillation signal; and
    a multiplier configured to multiply the multiplication signal multiplied by the frequency multiplier by the downlink signal received from the cables or the uplink signal received from the terminal apparatus, and
  the switch connects the cables to the frequency multiplier when the downlink signal and the uplink signal are transmitted and received.

* * * * *